United States Patent [19]

Fourrey et al.

[11] Patent Number: 5,507,561
[45] Date of Patent: Apr. 16, 1996

[54] PLAY-FREE ARTICULATION FOR A SEAT WITH TIPPING BACKREST AND ITS APPLICATION TO A SEAT WITH A BACKREST WHICH CAN ALSO BE INCLINED

[75] Inventors: Francais Fourrey, Montargis; Nathalie Large, Chatillon Coligny, both of France

[73] Assignee: Cesa-Compagnie Europeenne de Sieges Pour Automobiles, Levallois-Perret, France

[21] Appl. No.: 360,881

[22] Filed: Dec. 21, 1994

[30] Foreign Application Priority Data

Dec. 23, 1993 [FR] France .................................. 93 15598

[51] Int. Cl.⁶ ............................................. B60N 2/20
[52] U.S. Cl. .................... 297/378.12; 297/378.1
[58] Field of Search .......................... 297/378.12, 378.1, 297/354.1

[56] References Cited

U.S. PATENT DOCUMENTS

| | | | |
|---|---|---|---|
| 4,147,386 | 4/1979 | Stolper | 297/378.12 X |
| 4,484,779 | 11/1984 | Suzuki | 297/378.12 X |
| 5,150,632 | 9/1992 | Hein . | |
| 5,156,439 | 10/1992 | Idlani et al. . | |
| 5,205,609 | 4/1993 | Notta et al. . | |
| 5,211,445 | 5/1993 | Husted et al. | 297/378.12 |
| 5,240,309 | 8/1993 | Köjer | 297/378.12 |
| 5,383,699 | 1/1995 | Woziekonski et al. | 297/378.12 X |

FOREIGN PATENT DOCUMENTS

| | | |
|---|---|---|
| 2649942 | 1/1991 | France . |
| 3234305 | 3/1983 | Germany . |
| 4012860 | 10/1991 | Germany . |
| 2156901 | 10/1985 | United Kingdom . |

Primary Examiner—Milton Nelson, Jr.
Attorney, Agent, or Firm—Sughrue, Mion, Zinn, Macpeak & Seas

[57] ABSTRACT

An articulation having a fixed flange (21) secured to the seat part (11) and a movable flange (22) associated with the backrest (12), a bearing (30) made of male (31) and female parts (32), a lock (40) made of a fixed stop piece (41), of a movable latch (42) and of an elastic urging element (43), and an operating member (50) acting on the latch (42) counter to the elastic urging element (43). The articulation is such that at least one of these male (31) and female (32) parts has a non-circular configuration, and that the stop piece (41) has a cam-shaped profile and the latch (42) has a cam-follower-shaped profile and that the bearing (30) and the lock (40) are placed relative to one another in such a way that when the cam and cam follower are applied against one another the male part (31) and the female part (32) tend to move relative to one another in the direction which takes up the play between them.

7 Claims, 2 Drawing Sheets

1

PLAY-FREE ARTICULATION FOR A SEAT WITH TIPPING BACKREST AND ITS APPLICATION TO A SEAT WITH A BACKREST WHICH CAN ALSO BE INCLINED

BACKGROUND OF THE INVENTION

The present invention relates to an articulation for a seat with a backrest which can tip relative to the seat part and, more particularly, to a play-free articulation for such a seat particularly for vehicles, for example land-based motor vehicles.

The mechanisms which equip seats for motor vehicles, especially land-based motor vehicles, are sources of play and wear which result in unpleasant noises. Attempts have been made to develop backrest articulations which alleviate some of these drawbacks.

One mechanism solution is, for example, described in the document EP 0,121,452 for a seat in which the backrest can regularly be inclined relative to the seat part. The solution proposed eliminates the play in the articulation when the backrest is in the position in which it has the chosen inclination and is locked, this being regardless of the initial play due to manufacturing tolerances or subsequent play due to wear on the articulation.

Land-based motor vehicles of the sort having two side doors, for example of the "coupé" or "cabriolet" type, apart from the mechanism for adjusting the inclination of the backrest relative to the seat part of a seat, are equipped with a specific mechanism which especially allows the backrest to be tipped towards the front of the vehicle to facilitate access to that which is located to the rear of the seat. This type of mechanism is, usually, made up of a flange which is articulated to the seat part framework and of an articulated hook which is associated with the rear part of the flange and which interacts with a lock bolt fixed to the rear of the seat part framework. Such a mechanism is affected by play inherent, on the one hand, to the rear lock bolt/hook pairing and, on the other hand, to the spindle about which it tips forwards. Indeed, for such a seat to be able to lock back automatically as is usually the case when it is returned from its tipped forward position to its upright position in which it is in a situation to be occupied, on the one hand, and for the hook to be engaged fully home on the lock bolt in an irreversible locking position, on the other hand, it is necessary to have functional play. Such play is a source of parasitic noise which one tries to eliminate, sometimes by equipping one of these pieces of the mechanism with resilient limit stops made of rubber or of elastomer which compress during locking back and elastically absorb the existing clearance. However, the presence of such elastic limit stops is the prime cause of poor locking back and, in any case, these limit stops end up becoming compacted and therefore lose their ability to take up the operating play. What is more, the price of these limit stops and the cost of fitting them detracts from the retail prices.

Furthermore, all the play present in the various mechanisms tends to add up and give an unpleasant feeling of inferior quality. Such play exists or arises especially in the slideways for longitudinal adjustment, in the systems for heightwise adjustment, in the tipping articulations as well as in the devices for adjusting the inclination, etc. The existence of this play may result in a parasitic movement of several centimeters, measured at the uppermost point of the backrest, owing to the lever arm effect.

SUMMARY OF THE INVENTION

The object of the invention is to create a play-free articulation for a seat with a backrest which can tip and can move between an upright position of use and a folded-down non-obstructing position, especially for a motor vehicle seat, for example a land-based motor vehicle seat.

The subject of the invention is a play-free articulation for a seat with a seat part and with a backrest which can be tipped and can move between an upright position and a position in which it is folded-down relative to the seat part, which essentially comprises a fitting made of a fixed flange secured to the seat part and a movable flange associated with the backrest, a bearing made of a male part and of a female part interacting freely with one another with play and one of which is carried by one of the flanges and the other of which is carried by the other of the flanges, a lock made of a fixed stop piece and of a movable latch interacting with one another and one of which is carried by one of the flanges, and the other of which is carried by the other of the flanges as well as an elastic urging means acting on the latch and tending to apply the latter against the stop piece in order to immobilize the backrest in the upright position and an operating member acting on the latch counter to the elastic urging means in order to separate the latch from the stop piece so as to be able to tip the backrest from its upright position into its folded-down position. This device is characterized in that at least one of these male and female parts of the bearing has a non-circular configuration, and in that: the stop piece of the lock has a cam-shaped profile and the latch of the lock has a cam-follower-shaped profile intended to interact with that of the cam of the stop piece, and in that the bearing and the lock are placed relative to one another in such a way that when the cam and cam follower of the stop piece and of the latch of the lock are applied against one another by the elastic urging means, the male part and the female part of the bearing tend to move relative to one another in the direction which takes up the play between these male and female parts.

Another subject of the invention is the application of such an articulation to a seat equipped with a device for adjusting the inclination of the backrest relative to the seat part.

Other features of the invention will emerge from reading the description and claims which follow, as well as from examining the appended drawing, given solely by way of example, in which:

DESCRIPTION OF PREFERRED EMBODIMENTS

Figure 1:
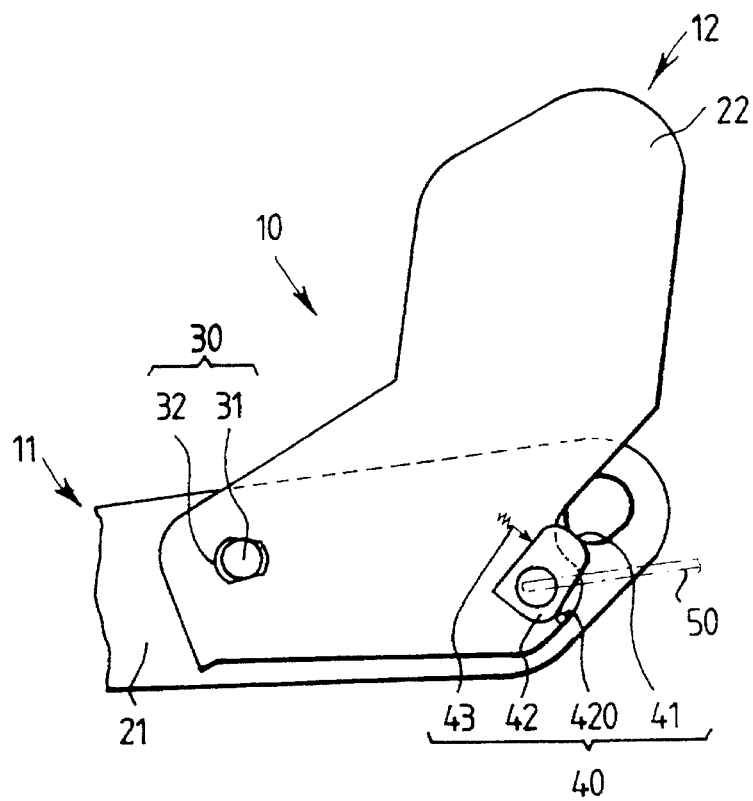
FIG. 1 is a diagrammatic side view of one embodiment of an articulation according to the invention in the upright position of the backrest of the seat.

Since seats with a backrest which can be tipped relative to the seat part and, in particular, those used on board motor vehicles, for example land-based motor vehicles, are well known in the state of the art, in that which follows only that which relates directly or indirectly to the invention will be described. For the rest, the person skilled in the art of the technical field in question will delve into the common conventional solutions at his disposal in order to confront the particular problems with which he is faced. In particular, he may find it useful to refer to document EP 0,121,452, for example.

For the convenience of the explanation, each of the component parts of an improved articulation according to the invention will be described in succession before the manufacture, if necessary, the assembly and the operation thereof are explained.

In that which follows, one and the same reference numeral is always used to identify a homologous element, regardless of the embodiment or alternative thereof.

A play-free articulation according to the invention is intended to equip a seat 10 which comprises a seat part 11 and a backrest 12 which can be tipped relative to the seat part, as is well known, of the sort, for example, of those which equip vehicles with two side doors, for example of the "coupé" or "cabriolet" type, where it is commonplace for the backrest which is normally in an upright position with a view to it being occupied by a passenger or by a driver can assume a folded-down non-obstructing position to facilitate access to that which is to the rear of the seat. As is known, the seat part and the backrest each comprise a framework, most usually mechanically joined, with which is associated a cushion or the like made of any appropriate material.

The play-free articulation according to the invention essentially comprises a fitting 20, a bearing 30, a lock 40 and an operating member 50.

The fitting 20 comprises a fixed flange 21 secured to the seat part 11 and a movable flange 22 associated with the backrest 12. A limit stop 220 secured to the fixed flange, interacting with the movable flange, determines the upright position of the backrest.

The bearing 30 comprises a male part 31 and a female part 32 interacting freely with one another and one of which is carried by one of the flanges 21, 22 and the other of which is carried by the other of the flanges 21, 22. Preferably, the male part 31 of the bearing 30 is carried by the fixed flange 21 and the female part 32 of the bearing 30 is carried by the movable flange 32. As may be observed, at least one of the parts of the bearing has a non-circular configuration, particularly a wedge-shaped configuration, for example one which is trapezoidal with curved bases and with straight sides in the form of flats, and the other of these parts if need be also has a non-circular configuration, especially with two non-parallel flanks. The male part is engaged in the female part so that it can move therein freely preferably with play and so that it can come into contact with the oblique sides of the wedge-shaped configuration and tend to "jam" therein without play when the backrest is in the upright position, as will be understood later. As may be observed, it is preferably the female part which constitutes a bearing surface while the male part constitutes a spindle.

The lock 40 comprises a fixed stop piece 41 and a movable latch 42 which interact with one another, and one of which is carried by one of the flanges 21, 22 and the other of which is carried by the other of the flanges 21, 22, as well as an elastic urging means 43 acting on the latch 42 and tending to apply this latch against the stop piece. A limit stop 420 such as a pin or a block limits the amplitude of the movement of the latch 42 under the action of the elastic urging means. For the particular embodiment illustrated, it can be seen that the stop piece 41 of the lock 40 is carried by the fixed flange 21 and that the latch 42 of the lock 40 is mounted so that it can tip, for example with the aid of a hole and of a rod or the like on the movable flange 22 which carries the limit stop 220. As may be observed, the stop piece has a cam-shaped profile and the latch has a cam-follower-shaped profile intended to interact with that of the cam. If need be, the latch is also equipped with a branch 421 for reasons which will become clear later.

The operating member 50 especially comprises a lever 51 pivoting in at least one direction, for example preferably carried by the flange 22 on which it is mounted in any appropriate manner and allowing action with the aid of an operating handle or the like on the latch 42 counter to the elastic urging means 43 in order to separate the latch 42 from the stop piece 41 so as to be able to tip the backrest from its upright position to its folded-down position. This lever preferably comprises an arm 511 intended to interact with the branch 421 of the latch 42 of the lock 40.

For this embodiment, it will be observed that the limit stop and the stop piece consist of one and the same piece or a piece made as a single part of which different regions will be used, but it is clear that limit stop and stop piece may be physically separate parts. Likewise, the upright position of the backrest may be defined by a stop piece placed elsewhere, for example on the backrest framework, and interacting with the floor of the vehicle.

Regardless of the embodiment, it is clear that the flanges may be attached to or of a single piece with the frameworks of the seat part and of the backrest.

The respective positions of the bearing 30 and of the lock 40 are chosen so that this bearing and this lock are placed, relative to one another, in situations which, when the cam and cam follower of the stop piece 41 and of the latch 42 of the lock 40 are applied against one another mean that the male part 31 and the female part 32 of the bearing 30 tend to move relative to one another in the direction which takes up the existing play, regardless of the nature thereof, between the male 31 and female 32 parts. For the embodiment illustrated, it will be observed that the oblique sides of the wedge-shaped configuration are convergent in the direction of the lock so that contact of the latch and of the stop piece under the action of the elastic urging means creates a reaction which tends to drive one of the parts of the bearing in the direction which ensures play-free contact between the male and female parts by a "jamming" phenomenon, whether this play results from manufacturing tolerances, or from wear.

All the component parts of an articulation according to the invention are made from conventional materials, for example metal ones, which are shaped and machined according to suitably adapted conventional techniques such as drawing, stamping, cutting, turning, milling, grinding, welding, riveting, screwing, etc.

All the component parts of an improved articulation according to the invention are joined together, assembled and fitted as emerges clearly from the figures of the drawing.

The operation of an articulation according to the invention will now be described, it being understood that for preference, each side of a seat is equipped with an identical or symmetrical articulation and that just one operating member serves to actuate the two articulations jointly, as is conventional.

It will be assumed that a seat is initially in the position in which it is illustrated in FIG. 1 with its backrest in the upright position locked without play in this situation.

It will be observed that the profiles chosen for the cam and for the cam follower and similarly the positions chosen for the points of contact between the cam and cam follower and the position of the tip spindle of the latch are such that under the action of its elastic urging means the lock is frozen irreversibly. This cam/cam follower contact creates a reaction component in the direction which automatically takes up any play existing between the male and female parts of the bearing.

If it is desired to tip the backrest and fold it down, for example forwards, in order to gain access to that which is at the rear of the seat, an action is exerted on the operating member in the appropriate direction in order to cause the latch to turn in the anticlockwise direction in FIG. 1, counter to the elastic urging means. The cam follower of the latch separates from the cam of the stop piece and it is then possible to tip the backrest by virtue of the bearing, to bring it closer to the seat part of the seat. The dimensions of the male and female parts of the bearing are such that the relative rotation is not disturbed by the presence of non-circular parts.

Figure 2:
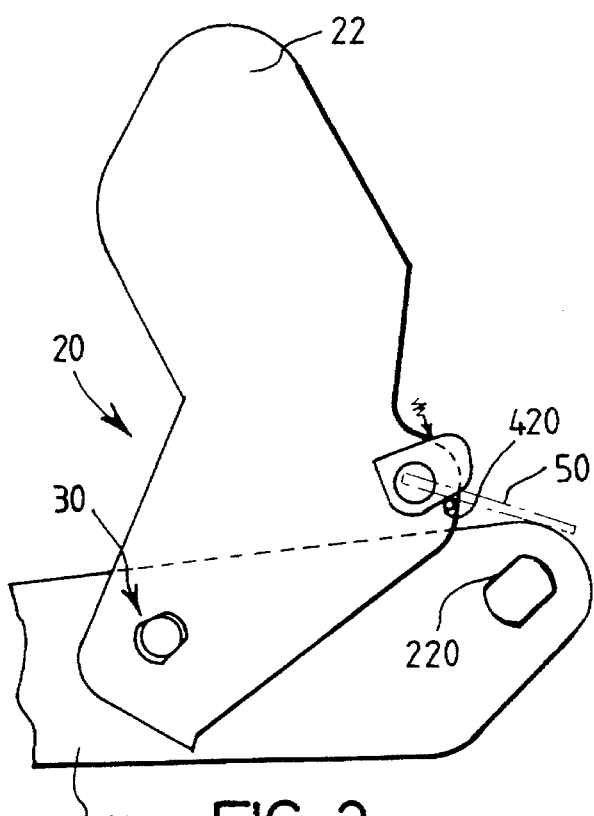
FIG. 2 is a view similar to that of FIG. 1 where the backrest is at the beginning of being folded down into the non-obstructing position.

In order to return the backrest from its folded-down non-obstructing position to its upright position of use, it is tipped in the clockwise direction in FIG. 2. The latch which has taken up its position in contact with its limit stop under the action of the elastic urging means which tends to make it turn in the clockwise direction, encounters the cam and moves out of the way tipping in the anticlockwise direction counter to its urging means, like an escapement mechanism, and thereby allows the backrest to resume its upright position in which the movable flange is applied against the limit stop. The latch, which is then spontaneously returned by its elastic urging means after having escaped the stop piece, resumes contact against the cam and guarantees irreversible locking.

At the same time, the elastic urging means which applies the cam and cam follower against one another and keeps them in contact with one another creates a reaction component which tends to press the male and female parts of the bearing together and keep them in contact owing to the non-circular configuration of at least one or other of these two parts.

It can therefore be seen that by virtue of the articulation according to the invention, a play-free locking is obtained owing to the fact that the bearing rests in equilibrium via two V-shaped contact zones of the male and female pieces because the lock, by virtue of the presence of its cam and cam follower, cancels out any play which there might also have been at the point where the catch is mounted so that it can tip.

It will furthermore be observed that the lock guarantees irreversible locking owing to the judicious choice of profiles adopted for the cam and cam follower which take account of the nature of the materials from which they are made, and of the judicious layout of the bearing, of the points of contact between the cam and cam follower and location of the spindle about which the latch tips. Thus, if it is desired, for example, to cause the backrest to tip without acting beforehand on the latch in order to unlock the lock, the immobilization of the cam follower on the cam tends to be reinforced. By virtue of this the articulation according to the invention is particularly resistant to the event of substantial longitudinal components of load resulting, for example, from a frontal impact or the like.

What is more, as explained previously, it will be observed that the device locks back automatically without it being necessary to act on the latch using the operating member.

The preceding explanation shows that the articulation according to the invention is simple, requires only a small number of component parts and completely eliminates the manufacturing, operating or wear-induced play for the upright and locked position, the relative positions between cam and cam follower and between male member and female member adjusting automatically.

It is clear that the parts played by the male and female parts of the bearing as well as those of the cam and cam follower of the lock can be swapped over.

Figure 3:
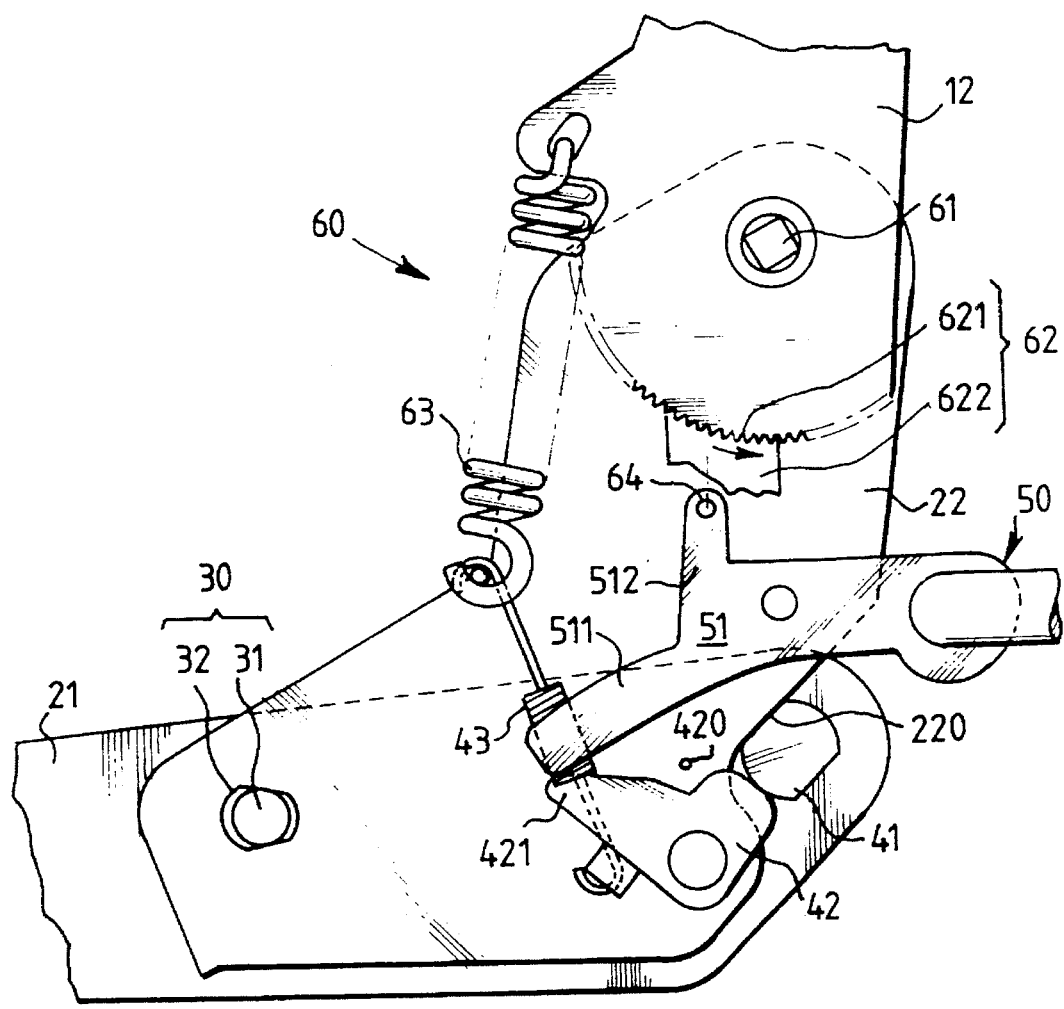
FIG. 3 is a view similar to that of FIG. 1 of another embodiment of an articulation according to the invention applied to the case in which the seat is furthermore equipped with a device for adjusting the inclination of the backrest relative to the seat part.

FIG. 3 illustrates the application of an articulation according to the invention to a seat whose backrest is furthermore equipped with a device for adjusting the inclination of the backrest relative to the seat part. The device for adjusting the inclination is for example of the type described by the previously mentioned document, to which reference may usefully be made.

It will merely be recalled that this device 60 for adjusting the inclination comprises a spindle 61 about which the backrest can be inclined so as to modify at will its orientation relative to the seat part.

The inclination is defined by immobilizing members 62 such as a toothed sector 621 and a tooth 622 interacting with the latter. The tooth can move closer to the toothed sector and "mesh" with it in order to immobilize it or can move away therefrom in order to release it and allow the inclination of the backrest to be modified. In this particular case, the operating member 50 of the articulation also makes it possible to act on the device for adjusting the inclination by acting on the tooth in order at least to move it at will away from the toothed sector. For this purpose, the operating member 50 comprises a lever 51 with a second arm 512 which interacts preferably indirectly with the tooth for example vial a linkage 64 of the type described in the abovementioned document, but for that reason merely represented diagrammatically by a broken line. In this case, the operating member 50 has two opposite directions of action. In one direction it acts on the lock 40 as previously indicated and does not have any effect on the inclination-adjusting device which remains immobilized. In the opposite direction, it has no effect on the lock, the latch being kept in contact with the stop piece via its elastic urging means, and it acts merely on the tooth in order to separate it from the toothed sector and allow the backrest to be moved into the desired position, if need be counter to the action of a return means 63 such as a coil spring which normally tends to place the backrest in the "upright" position. This is clearly illustrated in FIG. 3 where it can be seen that the elastic urging means 43 is anchored, on the one hand, onto the branch 421 of the latch and, on the other hand, onto the flange 22 and also that the return means 63 is anchored, on the one hand, on the backrest 12 and, on the other hand, on the flange 22.

What is more, to perfect the operation, instead of acting on just the lock or just the device at one time, the operating member while acting on one of these, furthermore guarantees freezing of the position of the other on which it is not operating in order to truly immobilize it in the position which maintains the inclination of the backrest or keeps the seat in the upright position.

The foregoing clearly demonstrates the distinctive features of the invention, shows the benefit which it offers, and explains the advantages which it affords.

What is claimed is:

1. Play-free articulation for a seat (10) with a seat part (11) and with a backrest (12) which can be tipped and can move between an upright position and a position in which it is folded-down relative to the seat part (11), which essentially comprises a fitting (20) made of a fixed flange (21) adapted to be secured to the seat part (11) and a movable flange (22) adapted to be associated with the backrest (12), a bearing (30) made of a male part (31) and of a female part. (32) interacting freely with one another with play and one of which is carried by one of the flanges (21, 22) and the other of which is carried by the other of the flanges (21, 22), a lock (40) made of a fixed stop piece (41) and of a movable latch (42) interacting with one another and one of which is carried by one of the flanges (21, 22), and the other of which is carried by the other of the flanges (21, 22) as well as an elastic urging means (43) acting on the latch (42) and tending to apply the latter against the stop piece (41) in order to immobilize the backrest (12) in the upright position and an operating member (50) acting on the latch (42) counter to the elastic urging means (43) in order to separate the latch (42) from the stop piece (41) so as to be able to tip the backrest (12) from its upright position into its folded-down position, the device being characterized in that at least one of these male (31) and female (32) parts of the bearing (30) has a non-circular configuration, and in that the stop piece (41) of the lock (40) has a cam-shaped profile and the latch (42) of the lock (40) has a cam-follower-shaped profile intended to interact with the cam-shaped profile of the stop piece (41), and in that the bearing (30) and the lock (40) are placed relative to one another in such a way that when the cam-shaped profile and cam-follower shaped profile of the stop piece (41) and of the latch (42) of the lock (40) are applied against one another by the elastic urging means (43), the male part (31) and the female part (32) of the bearing (30) tend to move relative to one another in a direction which takes up the play between these male (31) and female (32) parts.

2. Articulation according to claim 1, characterized in that the male part (31) of the bearing (30) is carried by the fixed flange (21), and the female part (32) of the bearing (30) is carried by the movable flange (22).

3. Articulation according to claim 1, characterized in that the stop piece (41) of the lock (40) is carried by the fixed flange (21), and the latch (42) of the lock (40) is mounted so that it can tip on the movable flange (22).

4. Articulation according to claim 1, characterized in that the operating member (50) comprises a pivoting lever (51) with an arm (511), in that the latch (42) of the lock (40) comprises a branch (421) which interacts with this arm (511) and which is subjected to the elastic urging means (43).

5. The articulation in accordance with claim 1, wherein said seal (10) is furthermore equipped with a device (60) for adjusting the inclination of the backrest (12) relative to the seat part (11), and wherein said operating member (50) has two opposing directions of action, one direction in which it acts only on the lock (40) so as to allow the backrest (12) to be tipped from its upright position into its folded-down position, and another direction in which it acts only on the adjustment device (60) to allow the inclination of the backrest (12) relative to the seat part (11) of the seat (10) to be changed.

6. Articulation according to claim 1, characterized in that the female part (32) has a wedge-shaped configuration with two oblique sides.

7. Articulation according to claim 6, characterized in that the male part (31) has two non-parallel flanks.

* * * * *